(12) United States Patent
Sasselli

(10) Patent No.: US 7,742,600 B2
(45) Date of Patent: Jun. 22, 2010

(54) PREPAID PAY TELEVISION SYSTEM

(75) Inventor: Marco Sasselli, Chardonne (CH)

(73) Assignee: Nagravision S.A., Cheseaux-Sur-Lausanne (CH)

( * ) Notice: Subject to any disclaimer, the term of this patent is extended or adjusted under 35 U.S.C. 154(b) by 1118 days.

(21) Appl. No.: 10/510,834

(22) PCT Filed: Apr. 9, 2003

(86) PCT No.: PCT/IB03/01319

§ 371 (c)(1), (2), (4) Date: Oct. 12, 2004

(87) PCT Pub. No.: WO03/085959

PCT Pub. Date: Oct. 16, 2003

(65) Prior Publication Data

US 2005/0177514 A1    Aug. 11, 2005

(30) Foreign Application Priority Data

Apr. 11, 2002   (EP)   .................................. 02008061

(51) Int. Cl.
H04N 7/167    (2006.01)
(52) U.S. Cl. .......................... 380/230; 380/37; 380/231
(58) Field of Classification Search .................. 380/16, 380/20, 37, 201, 231–233, 227–230, 240–241; 358/84
See application file for complete search history.

(56) References Cited

U.S. PATENT DOCUMENTS

| | | | |
|---|---|---|---|
| 4,484,217 A | | 11/1984 | Block et al. |
| 4,833,710 A | * | 5/1989 | Hirashima ................... 380/233 |
| 4,907,273 A | * | 3/1990 | Wiedemer ..................... 380/230 |
| 5,144,663 A | | 9/1992 | Kudelski et al. |
| 5,155,680 A | * | 10/1992 | Wiedemer ..................... 705/52 |
| 5,740,246 A | * | 4/1998 | Saito ............................. 705/52 |
| 5,835,589 A | * | 11/1998 | Nakashima ................... 705/51 |
| 5,909,485 A | | 6/1999 | Martin et al. |
| 6,126,069 A | | 10/2000 | Stiefel et al. |
| 6,282,293 B1 | | 8/2001 | Itoh et al. |
| 2001/0027558 A1 | * | 10/2001 | Sasselli et al. ................. 725/1 |
| 2002/0164036 A1 | * | 11/2002 | Stransky et al. ............. 380/285 |

FOREIGN PATENT DOCUMENTS

| | | |
|---|---|---|
| EP | 0 757 337 | 2/1997 |
| WO | WO 01/52124 | 9/2001 |
| WO | WO 02/21835 A1 * | 3/2002 |
| WO | WO 0221835 A1 * | 3/2002 |

* cited by examiner

*Primary Examiner*—Gilberto Barron, Jr.
*Assistant Examiner*—Hadi Armouche
(74) *Attorney, Agent, or Firm*—DLA Piper LLP US

(57) ABSTRACT

A system includes a managing center transmitting a data stream encrypted by control words included in control messages. The data stream is received by at least one user unit linked to a security module identified by a unique address. The security module contains a credit which is deducted according to the consumption of data from the stream. The security module can deduct the credit of an amount related to a product or an amount related to a duration, this amount and/or this duration being defined in the control message or in a management message. The user transmits to the managing center an identifier identifying the unique address and a value code representing an amount of credit to reload, the managing center dealing with and checking the value code and transmitting an encrypted message having the unique address and the amount to reload the credit with, to the security module.

12 Claims, 1 Drawing Sheet

PREPAID PAY TELEVISION SYSTEM

BACKGROUND OF THE INVENTION

The present invention concerns the domain of receivers/decoders of conditional access services, in particular an access system to an encrypted data stream calculated by a unit of time.

As an example of such data stream, we mean an information service about the stock exchange, weather forecast, general interest television, a sports event or others. These contents can be broadcasted on user units such as a pay-TV decoder, a computer, a portable phone, a "palm-top", a PDA, a radio, a television, or a multimedia terminal.

The digital stream is encrypted in order to be able to control use and define conditions for such use. This encryption is carried out thanks to control words, which are changed at regular intervals (between 5 and 30 seconds) in order to dissuade any attack aiming to find such a control word.

In order to allow the user unit to decode the stream encrypted by a control word, the latter is sent to it independently of the stream, in a control message (ECM) encrypted by a key suitable for the transmission system between the managing center (CAS) and the security module of the user unit.

In fact, the security operations are carried out in a security module (SC), which is generally in the form of an inviolably reputed microchip card. This unit can be either of a removable type or directly integrated to the user unit dealing with signals such as a paying TV decoder or a DAB receiver. In fact, the functioning of the invention authorizes the use of a user unit without a removable security module.

At the time of decrypting the control message (ECM), it is verified, in the security module (SC), that the right to accede to the considered stream is present.

This right can be managed by authorization messages (EMM), which load such a right into the unit (SC). Other possibilities are also possible such as the sending of decrypting keys.

The accounting of the use of such contents is today based on the principle of subscription, of purchasing events or of paying by time unit.

The subscription allows defining a right associated to one or several diffusion channels and allows the user to obtain these channels unscrambled if the right is present in his security module.

At the same time, it is possible to define rights specific to some contents, such as a film or a football match. The user can acquire this right (purchase for example) and these contents will be specifically managed by this right. This method is known under the denomination "pay-per-view" (PPV).

With regard to payment by the time unit, the security user unit comprises a credit that is debited according to the real consumption of the user. So for example, a unit will be debited each minute to this credit whichever the watched channel. It is possible according to the technical implementations, to vary the accounting unit, either in length, or in value per allowed time, even by combining these two parameters to adapt the invoicing to the kind of transmitted product.

At the time of decrypting the control words, it will be verified if an associated right to access conditions is present in the security module.

The control word is returned in a decrypted form to the user unit only when the comparison is positive.

This way of functioning demands that the managing center knows the user, his physical address, his bank details as well as all the payment traffic which allows him to renew his rights.

In fact, the principle of the subscription is based on the renewal obligation that is to say that a right cancels itself if it is not renewed. This way of proceeding avoids that anyone who subscribes to all the channels available terminates their subscription and arranges it so that the termination message does not ever reach its user unit. That is why such a right includes a time limit and its right for all the channels, if it is not renewed, cancels automatically at the end of a month for example.

One imagines thus the work necessary to follow the thousands of subscribers who regularly settle their invoices and to whom it is necessary to send a renewal message each month. Furthermore, such a message must be repeated for several days because the managing system does not know if the user unit is powered on.

It frequently happens that a user who was on holiday and who had switched off his apparatus finds on his return his user unit blocked. It is then necessary for him to call the managing center so that a personalized renewal message is sent to him.

So, a great part of the resources and the costs connected to the management of a center is allocated to the management of the subscribers.

A first solution using an electronic purse is described in document U.S. Pat. No. 6,282,293. The chip card contains a credit that is debited when an encrypted content is accessed. The accounting information is included in the transmitted signal and allows this accounting. To reload the credit, the user unit calls a managing center in order to send the consumed events and to reload the credit according to the terms agreed with this user, for example through a credit card.

In a large number of cases, on the one hand the user unit has no communication channel towards a managing center and on the other hand, one wish to avoid recording all users in a database with their payment means. Thus, this document do not allow to solve the aims of the invention, namely the creation of a set of user units without back channel and without the knowledge of each unit's owner.

SUMMARY OF THE INVENTION

The aim of this invention is to propose an innovating way of offering access to paying TV to a large clientele and thus by drastically reducing the costs connected to the management of the subscribers.

This aim is reached by a system having a managing center transmitting a data stream encrypted by control words (CW), these control words being included in control messages (ECM), this data stream is intended to be received by at least one user unit linked with a security module identified by a unique address, this security module containing a credit, which is decreased according to the purchase of products or to the consumption of the data stream, wherein the security module includes means to decrease the credit of an amount relating to a product or a duration, the user having user unit independent means to transmit an identifier representative of the unique address and a value code representing a reloading credit amount to the managing center, the managing center having means to proceed and verify the value code and to transmit an encrypted message having the unique address and the amount of the credit to reload to the security module.

Thus, according to the invention, the credit reloading means are independent from the user unit while keeping the managing center as supervisor of the reloading operations. Moreover, the transmission of this value code allows suppressing the invoicing of the user because this value code already contains the information proving that the user has acquired the rights to this value. According to other solutions of the prior art, the managing center handles in an independent way the customer's credit (invoicing, credit card) and transmits the reloading instructions through the modem.

According to the invention, the value code is transmitted through one of the modes described below and the reloading instruction is sent in the encrypted data stream, in a management message for example.

This value code (VC) can have several forms:

1.) A unique number is contained on a card to scrape off and defines a pre-paid credit. These cards are sold in shops and have a part hidden by a layer that is easy to remove with a fingernail or a coin. The number revealed is a unique number generated by a cryptographic system, that is to say that it must respect strict rules in its format. It is not possible in this way (or with very few probabilities) to generate such a number that is recognized as valid by the managing center. To this number is associated a value which is what the user has paid for to acquire this card. Once this number is used, it is not possible to present it again to the managing center.

2.) A bank account or credit card number and the amount to reload. According to the terms accepted by the managing center and in agreement with the banking institutions, the user can transmit his banking card number and the amount desired to be debited from his account. In this option, it is possible to use a removable security module and insert it in a terminal for that purpose. This terminal allows one either to receive ready cash (banknotes for example) or to read a bankcard (even a credit card). Once the amount desired by the user has been duly checked (either by the notes introduced in the slot of the terminal, or by the authorization of the banking organization), the terminal contacts the managing center and a message of the credit reloading is sent to the terminal that transfers it to the security module. During this operation, it is possible to collect data about the consumption of the user, data that is conserved in his security module.

3.) A phone number or wireless telephony identifier number and the amount to reload. The user can simply send the desired amount to reload to the address of the managing center. In this message the sender's number is automatically comprised and according to the agreements between he telephony operator and the managing center, the reloaded amount is debited on the phone account.

According to the operating procedure chosen, the user communicates the value code to the managing center accompanied by the identifier of his user unit. In this kind of application, the unique number of the security module will be considered as the number of the group formed by the user unit and the security module. For simplification reasons, it is possible to generate a representative simplified code of the unique number. In fact, this unique number is generally a number comprising a large number of digits, which are necessary for the system (creation dates, version etc.) but not indispensable to identify a unit. This is why a shortened number of the user unit (STB) may be displayed but sufficient to differentiate each unit.

According to a particular embodiment, it is possible for the user to transmit another number to the managing center in place of the number shortened in a procedure of initialization.

For example it can be for example a user's phone number. The managing center verifies that this new number is unique and associates this number to the unique number (UA). Consequently, it will be possible to replace the identification of the user unit with the phone number.

To reload his credit, the user can use a voice server and a classic phone that sends signals by DTMF. After having bought a value card (solution 1 of the value code), he calls the voice server of the managing center. He is asked to introduce its identifier number (UA) and the value code affixed to the card.

This operation does not take much time; the managing center checks the conformity of the value code and the identifier and if those data are correct, it prepares a reload message of this user unit.

The message is transmitted by the broadcast channel in encrypted form and only the security module has the means to decrypt this message. Each security module receiving this message checks if the unique address contained in the message corresponds to its address and if not, ignores it.

For the unit responding to the unique address (UA), the amount of the credit contained in this message is added to the remaining credit.

The term "managing center" is to be understood in the broad sense. In fact, in practice this entity is subdivided into several modules that can be located in different locations. These modules are the control messages (ECM) encryption unit, the management messages (EMM) encryption unit responsible for recharging the credit. The unit for dealing with value codes can be situated in a banking establishment if one considers variant 2, namely the connection with a credit center or on the premises of a phone operator if one considers variant 3, namely the sending of a short message by their portable phone. Once the value code is recognized and dealt with, a secured connection allows the encryption unit to be informed that a management message, in charge of sending the reload message, should be sent to his recipient.

The user disposes of means to display the credit remaining on his television at all times.

According to the mode using the portable phone, a simple short message (SMS) containing the value code and the identifier of its unit, allows his credit to be reloaded. If, furthermore, one has replaced his identifier by his phone number, only the value code is to be sent, the phone number being automatically transmitted to the addressee.

When the credit in the security module (SC) is sufficient, several operating modes are possible namely:

impulsive subscription: the user decides to use all or part of his credit to buy a subscription for one or several channels. So, a new right is created in the unit for the reception of said channels without any new action on his credit being necessary.

impulsive purchase: the user can decide to buy a transmission or a transmission group (a series or a retrospective) and a corresponding right is created in the security module.

deduction as time goes by: the user can decide to pay only what he actually consumes and the credit is consumed according to a payment method by a time unit.

The first two modes are preferably managed by the management messages (EMM) because they create a right inside the security module. While the third mode can only work with the control messages (ECM) in which one places the unit value as well as the acquired duration.

When a control message (ECM) is presented to the security module, the rights are checked according to a hierarchy starting from the largest right to the narrowest. So for example first one checks if the user has a subscription for these rights, then, if not if a right for impulsive purchase exists and as a last resort, one debits the credit by time unit.

BRIEF DESCRIPTION OF THE DRAWING

The FIG. 1 represents one embodiment of the invention.

DETAILED DESCRIPTION OF THE INVENTION

Figure 1:
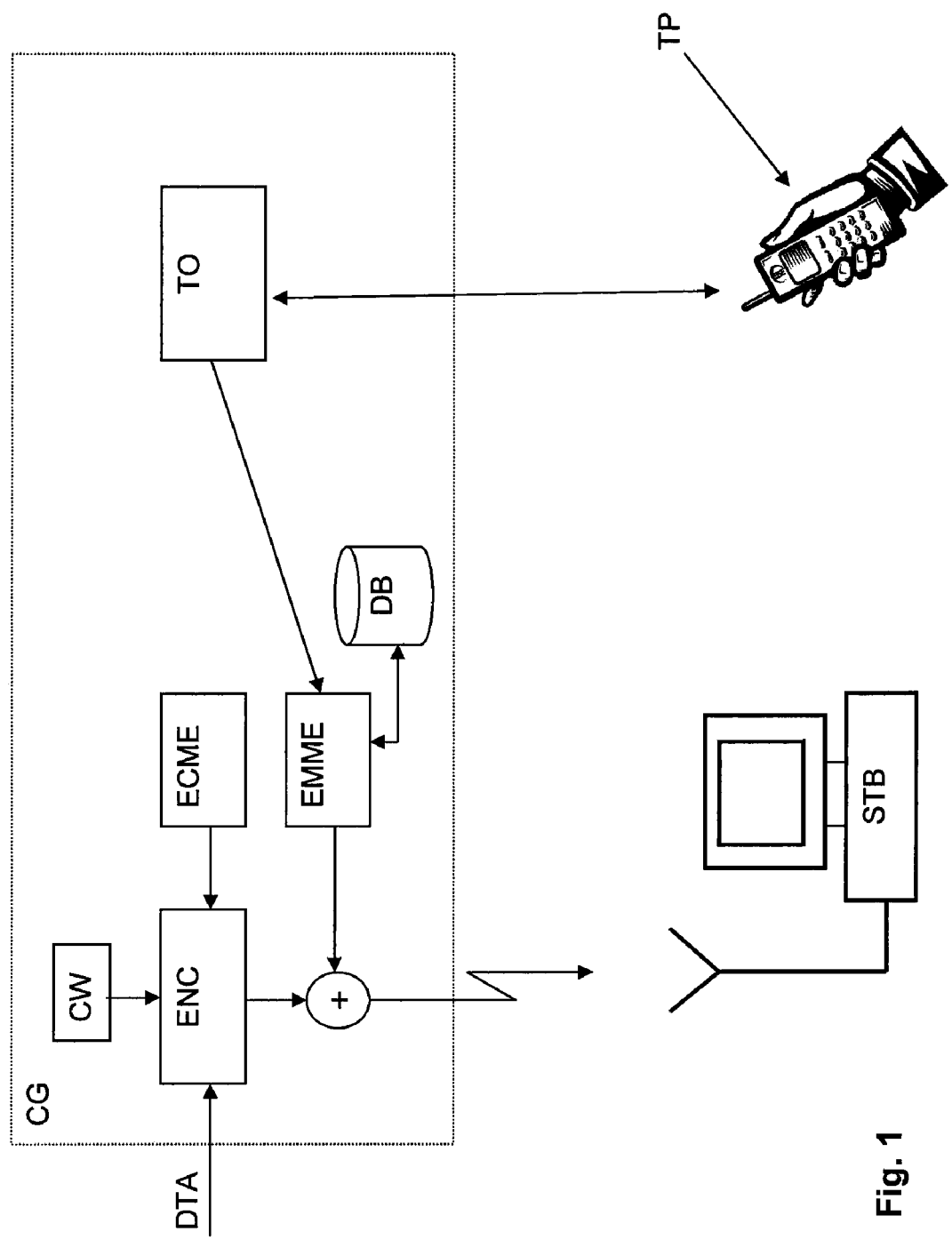

In FIG. 1, an embodiment is disclosed which is about the variant 3 of the value code. The managing center (CG) is disclosed by several elements such as a phone operator (TO), a data (DTA) encryption module (ENC), an encryption key (CW) control module (ECME) responsible for generating the control messages (ECM) and a managing module (EMME) responsible for generating the credit reload messages towards the security modules. Each decoder (STB) comprises a security module (SC) that memorizes the credit (CR) of the user.

According to the example of the value code in the form of a card to scrape, having a unique number, the user uses his portable phone (TP) to transmit this unique number by connection to the telephony operator (TO). This operator receives this information and transmits it to the managing module (EMME) with the user's phone number. The validity of this number is verified thanks to a database (DB) of the valid numbers and if this is the first time this number is used, the corresponding value (TA) is returned by the database. This number is then irrevocably invalidated.

Thanks to the phone number provided by the phone operator, the managing module (EMME) deduces the unique address (UA) of the security module and a corresponding message can be sent by the classic transmission channel (cable, radio, etc.). This message is generally repeated during several days. For this purpose, it is useful to add that the security module comprises means to process the message only once. This is assured by an identifier of the message that is also encrypted by transmission keys. This identifier is memorized in the security module therefore only such a message is received and processed. The security module from then on expects a different or upper identifier.

According to this way of proceeding, the database conserves a trace of the amount reloaded for each security module. It is possible to verify the consumption of each unit and detect fraud attempts. Furthermore, the sum of the reloaded amounts must always be lower than the sum of the value cards in circulation.

The invention claimed is:

1. A system comprising:
   a managing center, the managing center being configured to transmit, via a broadcasting channel, a data stream encrypted by control words, the control words being included in control messages;
   at least one user unit configured to receive said data stream; and
   a security module linked to the at least one user unit; the security module being configured with a unique address, the security module containing a credit, the security module being configured to decrease the credit according to the purchase of products or to the consumption of the data stream in an amount relating to a product or a duration, said amount and/or duration being defined in the control message or in a management message, the security unit further being configured to increase the credit in response to an encrypted message received from the managing center via the broadcasting channel, the credit being increased in an amount indicated by the encrypted message;
   wherein the managing center is configured to receive, from a user using a communication channel separate from the user unit and distinct from the broadcasting channel, an identifier representative of the unique address and a value code representing an amount of a credit to reload, the value code being unique and providing access rights to the product, a set of products or the duration, the managing center being configured to accept the value code only once and to process and verify the value code and to transmit to the security module, via the broadcasting channel, an encrypted message comprising the unique address and indicating the amount of the credit to reload into said security module.

2. The system according to claim 1, wherein the value code is a unique code pre-established by the managing center and complying with the cryptographic composition rules, the managing center comprising means to check said code and extract the value which will be credited in the security module.

3. The system according to claim 1, wherein the user has a phone number and means to associate the unique address to the phone number, the value code being transmitted to the managing center with the phone number, said center having means to transmit the reload message to the user unit whose unique address is associated to the phone number.

4. The system according to claim 1, wherein the product is a pay TV subscription for a determined duration or a transmission or group of transmission for impulsive purchase.

5. A method comprising the steps of:
   receiving at a user unit on a broadcasting channel a data stream encrypted by control words, the control words being included in control messages said data stream; and
   decreasing a credit stored in a security module linked to the at least one user unit according to the purchase of products or to the consumption of the data stream in an amount relating to a product or a duration, the amount or duration being defined in the control message or in a management message, the security module being configured with a unique address;
   receiving at a managing center, from a user using a communication channel separate from the user unit and distinct from the broadcasting channel, an identifier representative of the unique address and a value code representing an amount of a credit to reload, the value code being unique and providing access rights to the product, a set of products or the duration;
   verifying at the managing center that the value code is valid and has not been previously accepted;
   transmitting to the security module, via the broadcasting channel, an encrypted message comprising the unique address and indicating the amount of the credit corresponding to the value code; and
   loading the credit corresponding to the value code into said security module.

6. The method of claim 5, further comprising the step of storing at the managing center an indication that the value code has been accepted.

7. The method of claim 5, wherein the value code is a unique code pre-established by the managing center and complying with the cryptographic composition rules, and wherein the managing center further performs the step of checking the code and extracting the value which will be credited in the security module.

8. The method of claim 5, wherein the identifier is a phone number associated with the user and wherein the managing center transmits the reload message to the user unit whose unique address is associated with the phone number.

9. The method of claim 5, wherein the product is a pay TV subscription for a determined duration.

10. The method of claim 5, wherein the product is one or more transmissions for impulsive purchase.

11. The method of claim 5, wherein the identifier and the value code are received from the user via a second device connected to the communication channel separate from the user unit and distinct from the broadcasting channel, the second device being separate from the user unit, the security module and the managing center.

12. A system comprising:
   a managing center, the managing center being configured to transmit, via a broadcasting channel, a data stream encrypted by control words, the control words being included in control messages;
   at least one user unit configured to receive said data stream; and
   a security module linked to the at least one user unit; the security module being configured with a unique address, the security module containing a credit, the security module being configured to decrease the credit according to the purchase of products or to the consumption of the data stream in an amount relating to a product or a duration, said amount and/or duration being defined in the control message or in a management message, the security unit further being configured to increase the credit in response to an encrypted message received from the managing center via the broadcasting channel, the credit being increased in an amount indicated by the encrypted message;
   wherein the managing center is configured to receive, from a second device connected to a communication channel separate from the user unit and distinct from the broadcasting channel, an identifier representative of the unique address and a value code representing an amount of a credit to reload, the value code being unique and providing access rights to the product, a set of products or the duration, the second device being separate from the user unit, the security module and the managing center, the managing center being configured to accept the value code only once and to process and verify the value code and to transmit to the security module, via the broadcasting channel, an encrypted message comprising the unique address and indicating the amount of the credit to reload into said security module.

* * * * *